Dec. 9, 1924.
D. W. L. FRANK
SCRIBER GAUGE
Filed July 16, 1921   2 Sheets-Sheet 1
1,518,647
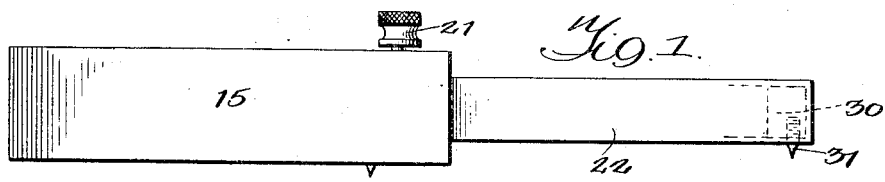
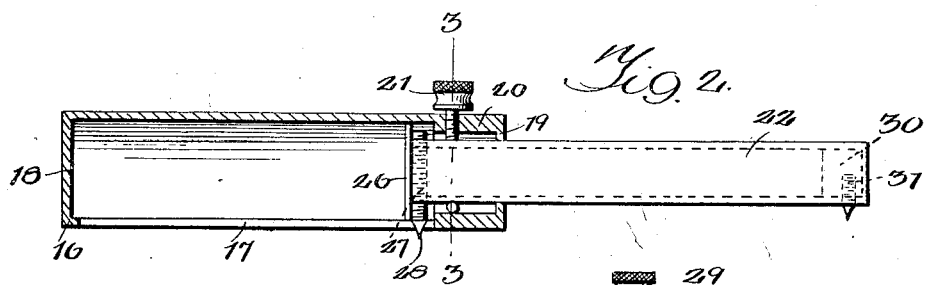
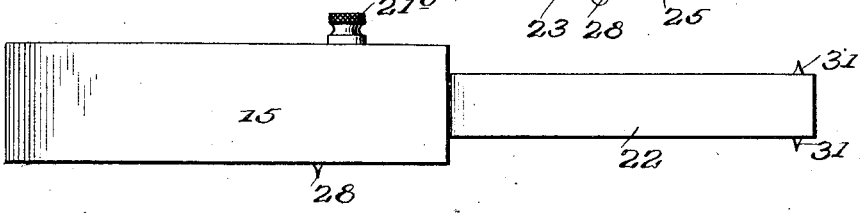
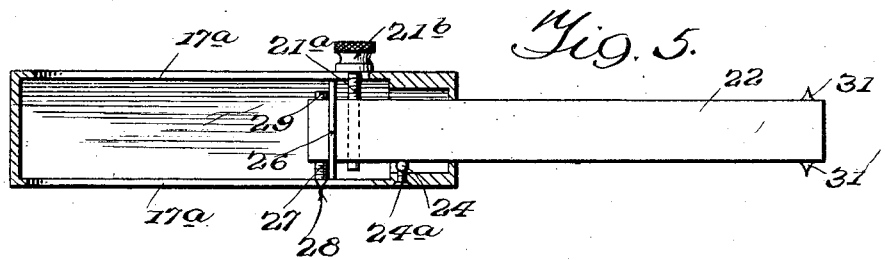
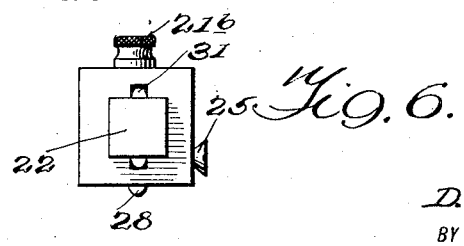
WITNESSES
INVENTOR
D. W. L. FRANK,
BY
ATTORNEYS Dec. 9, 1924.                                                              1,518,647
D. W. L. FRANK
SCRIBER GAUGE
Filed July 16, 1921                    2 Sheets-Sheet 2
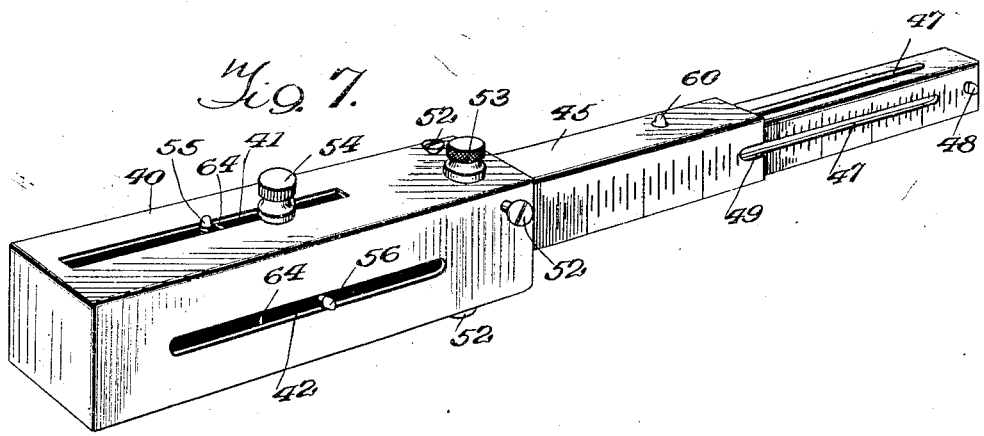
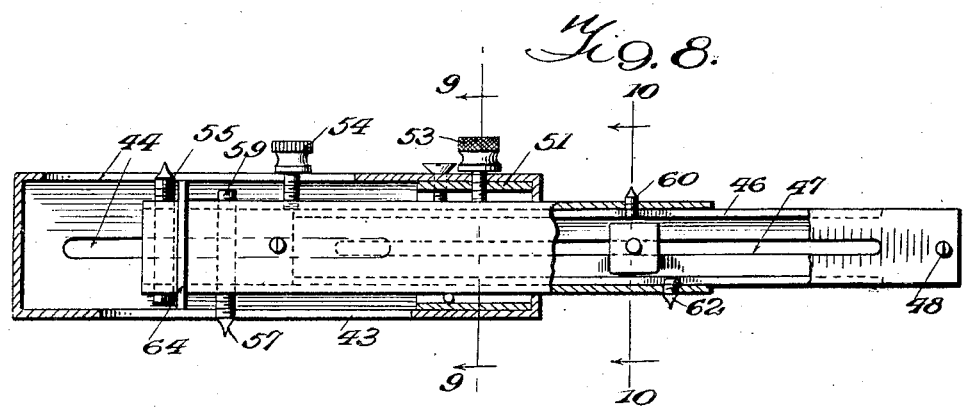
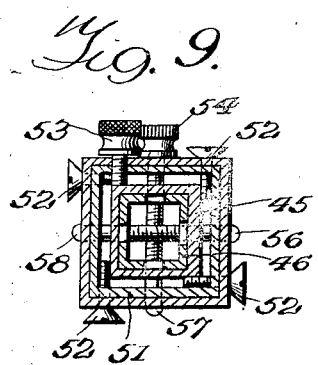
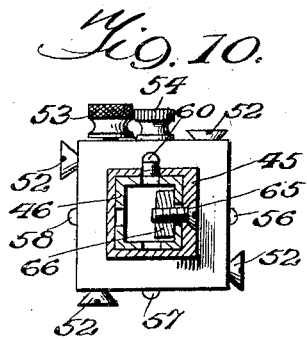
WITNESSES
George C. Meyer
G. S. Brock
INVENTOR
D. W. L. Frank,
BY
ATTORNEYS Patented Dec. 9, 1924.

1,518,647

UNITED STATES PATENT OFFICE.

DANIEL W. L. FRANK, OF MOBILE, ALABAMA.

SCRIBER GAUGE.

Application filed July 16, 1921. Serial No. 485,216.

*To all whom it may concern:*

Be it known that I, DANIEL W. L. FRANK, a citizen of the United States, and a resident of Mobile, in the county of Mobile and State of Alabama, have invented certain new and useful Improvements in Scriber Gauges, of which the following is a specification.

This invention relates to gauges and has reference more particularly for combined marking, butt, mortise and panel gauges.

An object of this invention is to provide a gauge having scratch points which may be adjustably set in relation to each other, and thereafter adjustably set in relation to working faces, thus permitting a mortise to be laid out along the edge of a door or jamb.

Another object is to provide a gauge within which ordinary scratch points are incorporated as well as sets of points which may be simultaneously adjusted in relation to each other and their working faces.

Another object is to provide a butt gauge which can be set for all widths of doors up to its full extent.

Another object is to provide a butt gauge that can be instantly set for one or six different thicknesses of doors.

Another object is to provide a combination gauge that can be used for a simple marking or thumb gauge.

With these and other objects in view the invention consists in certain novel features of construction and arrangements of parts as will be hereinafter fully set forth and pointed out in the claims, reference being had to the drawings, in which—

Figure 1 is a side elevation of one embodiment of the invention.

Figure 2 is a longitudinal section through the stock of the gauge.

Figure 3 is a transverse section on line 3—3 of Figure 2.

Figure 4 is a side elevation of a slightly different form.

Figure 5 is a longitudinal section of the stock of form shown in Figure 4.

Figure 6 is a front end view of same.

Figure 7 is a perspective view of a gauge embodying my improvements in their fullest development.

Figure 8 is a sectional view with parts in elevation, of this form in one of its adjusted positions.

Figure 9 is a transverse section taken on line 9—9 of Figure 8.

Figure 10 is a transverse section taken on line 10—10 of Figure 8.

In its simplest form the device is shown in Figure 1 wherein 15 indicates the stock of the gauge which is tubular and preferably of rectangular form. One wall 16 (the lower in this instance) is provided with a slot 17, which extends from near the butt end 18 through a greater portion of the length of the stock.

The front wall 19 has a central opening which is preferably rectangular in shape. The forward end of the stock has its walls thickened as indicated at 20, and through one of these is threaded a thumb screw 21 having a knurled head and which is adapted to engage the perimeter of a slidable gauge bar 22 which is also tubular in the main, and to lock it at any predetermined point, the outer faces of the bar being provided with a scale divided into 16ths of an inch. It should be noted that a space 23 is left between the thickened portion of the stock and this slidable graduated bar, and through one side wall is threaded a scriber or marking screw comprising a threaded shank 24 and a sharp edged head 25; the shank passes through the thickened walls 20 and lies in the space between the stock and the gauge bar 22.

The rear end of the bar 22 is closed by a plate 26 which extends beyond the sides of the bar having a sliding fit within the stock and serving as a guide collar.

Just in advance of this collar a scratch point is placed, this scratch point comprising a threaded pin 27 having a sharp point 28 which extends through the slot 17 of the stock, and the other end of the threaded pin is provided with a kerf or notch 29 into which a screw driver may be introduced to adjust the scratch pin and to force it outwardly to permit the pointed end to be sharpened when worn down.

The outer end of the gauge bar has within a solid block 30 into which is to be threaded a scratch point 31; the point may be screwed in and out by using a pair of pincers.

In Figures 4, 5 and 6 the gauge shown follows closely the construction and arrangement shown in Figures 1, 2 and 3 but differs in the following respects: The bar 22 is provided with two scratch points 31, and at the rear end the guide collar 26 is located in advance of the adjustable scratch pin 27 which extends through the bar 22. The device for locking the bar at any point differs slightly from the first described form, by including a screw bolt 21ª which passes through a slot 17ª in the upper face of the stock and has threaded on it a thumb or wing nut 21ᵇ. The scriber or marking screw 24—25 is applied in the same manner as before, but provision is made to lock it, and prevent it from being jarred loose by threading a short stud screw 24ª through the thickened front portion of the stock, all as plainly shown in Figure 5.

In Figures 7, 8 and 9 is shown the device in its complete development and this form includes the butt or stock member 40 having the slots 41, 42, 43 and 44 which are of different lengths, the stock being tubular as in the other forms. The butt or stock member which is the outer member of a three sectioned telescopic gauge is adapted to house a middle tubular gauge bar 45 telescopically connected therewith and an inner tubular gauge bar 46, the inner member being slotted in two sides as indicated at 47, and having a graduated scale on four sides and a scratch point 48 at its end said point being threaded into the end which has a solid block therein. The section 45 has a cut out portion which forms a seat for the scratch point 48 and houses the same when the sections are collapsed or nested one within the other.

The stock 40 is provided with the scribers 52 which are sharpened screws threaded through the forward end of the stock at the side corners their inner ends screwing through a reinforcing band 51 within the forward end of the stock; these scribers or marking screws 52 project outwardly from the stock from the four walls. Through the reinforce band 51 is also threaded the thumb screw 53 which is to bear against the middle section 45 and lock or hold it at any point where desired.

Through one of the slots of the stock a thumb screw 54 may be introduced screwing into the middle section and acting as a handle or button by which the middle section may be moved in and out of the stock 40.

The middle section is provided with scratch points 55, 56, 57 and 58 which are threaded through the middle section and have their blunt ends provided with kerfs or notches 59 to receive a screw driver by which they can be adjusted outwardly to have the points sharpened when needed.

The middle section is also provided with scratch points 60, 62 screwed into the side walls and they may be screwed into and out of place by means of pincers.

The middle section 45 is provided near its rear end with a guide collar 64 and the scratch pin 55 is threaded through the section to the rear of the said guide collar, the scratch pins 56, 57 and 58 passing through the middle section in advance of the guide collar and in different planes, the purpose of this arrangement being to provide for a greater variety of adjustments with respect to the scratchers.

This same arrangement of "staggering" or locating in different transverse planes is carried out with the scratch points 60, 62 for the same purpose.

The middle section 45 is locked or clamped to the inner or smaller section 46 at any desired adjustment by a screw 65 which passes through one of the slots 47 and engages a nut 66 within the hollow section 46. The inner section 46 may have four slots cut in it, that is through all four walls for the reason that if it is desired to make the middle slide no thicker, the scratch points can be screwed into metal blocks inside the inner slide.

To tighten the screw 65 which engages the nut 66 a screw driver is to be used.

The inner section is provided with a scale graduated and laid off in $\frac{1}{16}''$ up to three inches and the middle slide will be laid off the same way, the object of the same being that in using the device as a mortise marking or a panel gauge one can always get and readily see what distance is between the outer scratch point and shoulder of gauge, by sliding one or both in or out, the distance being always indicated by the rule scale, and there may be a rule graduated on all four sides.

The scribers or marking screws on the outside of the gauge are for the various thicknesses of hinges, and each screw is in its respective place to correspond with the scratch point on the same side for that thickness of door, whatever that may be. For instance when the butt gauge is closed, the closest scratch point is always set for $\frac{7}{8}''$ or $1\frac{1}{8}''$ door, and the gauge from back edge of door gives the distance the hinge is to set inwardly therefrom.

The screw on top gives the thickness of hinge, being the depth to chisel out. The next one is set for $1\frac{3}{4}''$ doors and screw on top set for thickness of hinge the same as others. The next one is set for $2''$ and $2\frac{1}{4}''$ doors and the screw on top is set for thickness of hinge.

Any variation can be made for any thickness of door or any thing to be gauged, by turning screws in or out as desired, and drawing slide out to the requisite distance. While the scratch points are shown flattened to a sharp edge they can be ground to a point. An advantage in having the scratch points threaded is that they can be regulated to mark any depth simply by turning scratch points in or out with a screw driver.

To use for a mortise or tenon, for example, say $\frac{3}{4}''$ mortise $\frac{3}{8}''$ from edge of material, draw middle section 45 out until one or the other points measure $\frac{3}{8}''$ from end of gauge, then loosen screw slightly in third or inner section and draw out until point measures ¾″ from either of the other points used; then tighten up screw and it is ready for use.

The sections can be made any length desired, and any desired number of telescoping sections may be used. One or more binding screws such as 53 may be used, more than one adding to the security against slipping of the inner parts. Also any number of scratch points can be used. Furthermore all of the depth screws or scribers can be held against loosening by set screws such as are shown in Figure 5. As the uses of of gauges of this character are well known to persons skilled in the art to which it appertains it is deemed unnecessary to further describe the operation of this particular device.

While I have shown the tubular sections as substantially rectangular it is of course understood that they may be cylindrical or any other shape that will permit of the telescopic action and permit the various adjustments to be made.

I claim:

1. A combination gauge of the character herein set forth comprising a tubular stock or butt member, a plurality of gauge bars telescopically disposed within the same, a plurality of scribers mounted around the stock adjacent its forward end and transversely adjustable thereof and scratch points mounted on said gauge bars and transversely adjustable thereof.

2. A combination gauge of the character and for the purposes described, comprising a tubular stock or butt member, a depth scriber carried by said stock adjacent its forward end transversely adjustable thereof, and a plurality of tubular telescopic gauge bars mounted to slide within said stock, and scratch points carried by said gauge bars, at least one of which is transversely adjustable through said stock.

3. A combination gauge of the character specified comprising a tubular butt member, said member having longitudinal slots of different lengths through its several walls, markers projecting laterally from each face and adjacent the forward end of the butt member and transversely adjustable thereof, a plurality of telescoping rectangular tubular gauge bar sections adapted to be telescoped and housed in said butt member, transversely adjustable scratch points carried by the intermediate gauge bar section and projecting through said slots and in different transverse planes, the telescoping gauge bar sections having transversely adjustable scratch points adjacent their forward ends, and means for locking the several gauge bar sections in predetermined adjustable relation to each other and to the butt member.

4. A combination gauge of the character and for the purposes described comprising a tubular stock or butt member, a series of adjustable depth markers carried by said stock adjacent one end, means for locking said markers in adjusted position, and a plurality of tubular telescopic gauge bars mounted to slide within said stock, scratch points carried by such gauge bars, at least one of which points is transversely adjustable through said stock.

5. A combination gauge of the character specified comprising a tubular stock or butt member, an adjustable depth marker or scriber carried by said stock, said butt member having longitudinal slots of different lengths through its several walls, adjustable markers or scribers projecting laterally from each face, a plurality of telescoping rectangular tubular gauge bar sections adapted to be telescoped and housed in said stock, transversely adjustable scratch points carried by an intermediate gauge bar and projecting through said slots in the stock and in different transverse planes, the intermediate gauge bar being provided with transversely adjustable scratch points beyond the forward end of the stock, the forward end of the intermediate gauge bar having a cut out portion, and an inner gauge bar having a scratch point at its outer end, said inner gauge section being adapted to telescope within the intermediate gauge bar and its end scratch point adapted to seat within said cut out portion, and coacting means carried by the intermediate and inner sections to lock the same together at various points of adjustment.

6. A combination gauge of the character herein set forth comprising a tubular stock or butt member, a transversely adjustable depth scriber carried by said stock adjacent its forward end, a tubular gauge bar mounted to slide within and be housed by said stock, a guide collar mounted on said bar adjacent its inner end, a transversely adjustable scratch point carried by the gauge bar adjacent the outer end thereof, a transverse scratch point threaded through said gauge bar adjacent the aforesaid guide collar, and adjustably transversely through said stock, and screw means disposed adjacent the forward end of the stock for locking the gauge bar in various adjusted positions.

DANIEL W. L. FRANK.